United States Patent Office 2,876,750
Patented Mar. 10, 1959

2,876,750

FUEL CONTAINING ANTI-ICING ADDITIVES

Donald Eaton Carr, Bartlesville, Okla., assignor to Phillips Petroleum Company, a corporation of Delaware No Drawing. Application January 21, 1954
Serial No. 405,518

23 Claims. (Cl. 123—1)

This invention relates to a novel fuel composition. In one aspect it relates to a method of operating an internal combustion engine. In another aspect, it relates to a method of preventing cold stalling of such an engine.

It has been observed that an internal combustion engine having a carburetor will stall while being warmed up when certain combinations of atmospheric temperature and humidity exist. This stalling, known as "cold stalling," is caused by the formation of ice on the throttle plate and adjacent parts of the carburetor, and especially around the idling jet. The ice results from the cooling effect of the vaporization of fuel within the carburetor and from the pseudo-adiabatic expansion of carburetor air in the metering venturi and past the edges of the throttle plate, the cooling causing moisture in the incoming air to accumulate as ice in the carburetor. The accumulated ice prevents free flow of fuel and air to the cylinders. Cold stalling ordinarily occurs when the atmospheric temperature is in the range of about 30 to 60° F. and the relative humidity is greater than about 60 percent.

One prior art method of preventing cold stalling caused by ice formation in the carburetor involves the incorporation of isopropyl alcohol as an anti-icing agent into the fuel supplied to the engine. In road tests using four 1953 model automobiles operated in an ambient air temperature of 40° F. and supplied with air of 100 percent relative humidity, an average of 16 stalls for each car was encountered using a regular grade fuel not containing an anti-cold-stalling additive. The addition of 2 weight percent isopropyl alcohol to the fuel resulted in freedom from cold stalling in all of the automobiles under the conditions of the test, but the addition of only 1 weight percent isopropyl alcohol resulted in an average of 3 stalls in each of the four automobiles. The procedure used in the road test comprised starting and idling the engine, which was originally at the temperature of the ambient air, for a period of 20 seconds; driving the automobile at 20 miles per hour for 0.2 mile; stopping the automobile and idling the engine for 20 seconds; and repeating the driving, stopping, and idling procedure until three consecutive stall-free stops were obtained. Whenever the engine stalled, it was immediately restarted and driven for 0.2 mile at 20 miles per hour before another stop was made. More recent tests show that the addition of 2 weight percent of isopropyl alcohol, though effective, does not give complete freedom from stalling in all cases.

The present invention provides a method and a novel fuel composition, whereby the operational difficulties of cold-stalling and rough idling, encountered in connection with carburetted internal combustion engines, such as automotive, aircraft, marine engines, and the like, operated under cool, humid atmospheric conditions, are reduced. The invention provides a fuel composition which permits a carburetted internal combustion engine to be operated at idling or light load conditions in atmospheric conditions of temperature in the range of 30 to 60° F., and relative humidity above about 60 percent without excessive stalling resulting from the formation of ice in the carburetor of the engine.

According to this invention, there is provided a fuel comprising at least one hydrocarbon which boils in the gasoline boiling range and a minor proportion of a perfluorocarboxylic compound.

Further, according to this invention, cold stalling of an internal combustion engine is prevented by a method which comprises supplying to the carburetor of said engine, together with a hydrocarbon fuel boiling in the gasoline boiling range, a minor amount, effective to prevent said stalling, of a perfluorocarboxylic compound. The additive can be supplied to the engine as a constituent of the fuel, e. g. in solution or suspension in the hydrocarbon, or it can be supplied from a separate source as an auxiliary additive so that its use can be discontinued when cold-stalling conditions do not exist.

The additives of this invention are represented by the formula $C_nF_{2n+1}$ COOH, wherein $n$ is an integer of at least 3, and preferably in the range 3 to 20. The carbon chain can be straight or branched. Examples are n-perfluorobutanoic acid, n-perfluoropentanoic acid, n-perfluorohexanoic acid, n-perfluorooctanoic acid, alpha-(trifluoromethyl)-perfluorobutanoic acid, alpha-(trifluoromethyl) - gamma - (penta-fluoroethyl)-perfluorohexanoic acid, and the like. Mixtures of two or more such compounds can be used as the additive.

According to this invention, carburetor icing is substantially prevented by admixing with the fuel a small amount of perfluorocarboxylic compound containing at least 3 carbon atoms and preferably containing at least 6 carbon atoms per molecule. Perfluorocarboxylic compounds which have been found to have anti-icing properties when admixed with a hydrocarbon fuel include perfluorobutanoic acid, perfluoropentanoic acid, perfluorohexanoic acid, perfluorooctanoic acid, perfluorodecanoic acid, perfluorododecanoic acid, and the like. The perfluoro acids are very effective when admixed as the sole anti-icing additive, with the hydrocarbon fuel in small amounts; however, these compounds can also be employed in combination with other compounds having an anti-icing effect to obtain an improved anti-icing additive. Specific compounds which can be admixed with the additives of this invention are the monoalkyl ethers of the monoethylene, diethylene, and triethylene glycols and include ethylene glycol monoethyl ether (Cellosolve) and diethylene glycol monoethyl ether (Carbitol). Compounds which have no anti-icing effect by themselves can also be admixed with the simple or combination anti-icing additives to increase the amount of these compounds which can be dissolved in the fuel. Methyl and ethyl alcohol can be used for this purpose.

The amount of the additives admixed with the engine fuel varies over a wide range and depends to some extent on the physical properties of the compounds. Usually, the concentration of the additive admixed with the fuel is not greater than 10 weight percent and the actual concentration depends on the solubility of the additive in the fuel. Very small concentrations have been found to have very effective anti-icing properties but usually the concentration is greater than 0.001 weight percent of the fuel. Preferably, the amount of additive used is in the range of 0.01 to 0.1 weight percent of the fuel and more preferably the concentration is in the range of 0.02 to 0.06 weight percent.

The anti-icing additives of this invention can be admixed with any carburetted internal combustion engine fuel and are of particular application to an engine fuel having a volatility such that the 50 percent distillation point falls below about 310° F. These fuels may be obtained from mineral oils or gaseous hydrocarbons derived from any source and by any of the known commercial methods of manufacture, such as straight-run distillation, catalytic cracking, thermal cracking, destructive hydrogenation, polymerization, alkylation, hydrogenation, or the like. The fuels may also contain commonly used fuel additives such as lead alkyl anti-detonants (e. g. tetraethyl lead), lead scavenging agents, dyes, gum inhibitors, oxidation inhibitors, and the like. The gasoline used should be free of elemental sulfur. It should be "doctor-sweet." Generally the fuel can be any desired hydrocarbon, or mixture of hydrocarbons, having a boiling point within the gasoline boiling range, i. e. 70 to 420° F., or it can be a liquefied petroleum gas, e. g. butane.

EXAMPLE

Cold stalling tests were performed using a Carter carburetor, type WO–870S, mounted on a motored CFR Supercharged Aviation Fuel Test engine which served to draw the fuel through the carburetor and to dispose of the combustible fuel-air mixture. The carburetor was mounted in an insulated chamber and the air supplied to the carburetor had a temperature of 40° F. and 100 percent relative humidity. The air was supplied at a rate of 0.58 pound per minute and the air-fuel ratio of the combustible mixture varied between 8:1 to 10:1. The CFR engine was operated at constant speed of 2000 R. P. M. with 6 inches Hg vacuum manifold pressure. The base fuel used in the tests was an unleaded automotive gasoline having a Reid vapor pressure of 14.0 lb. and the following ASTM distillation (° F.):

| | |
|---|---|
| Initial | 79 |
| 10% | 96 |
| 20% | 109 |
| 40% | 138 |
| 60% | 186 |
| 80% | 264 |
| Final | 392 |

In the anti-icing tests, the fuels were cooled to a temperature of 40° F. and maintained at that temperature while being supplied to the carburetor.

In the test procedure, the CFR engine was operated on the injected fuel at a constant speed of 2000 R. P. M. and then the injected fuel flow rate was reduced as the test fuel was admitted to the engine through the carburetor to maintain the constant 2000 R. P. M. engine speed. The length of time was measured from the start of the flow of test fuel to the carburetor to the point where the ice buildup on the throttle plate and adjacent parts of the carburetor was sufficient to raise the manifold vacuum 2 inches of mercury. For purposes of evaluating the anti-icing qualities of the additives of this invention, these icing tests were also performed on a test fuel containing isopropyl alcohol.

The anti-icing characteristics of several of the additives of this invention are given in Table I and compared to the anti-icing effects of other additives. In obtaining these data, the base fuel was tested with several concentrations of additive and the concentration of additive equivalent in anti-icing quality to 1.5 or to 2.0 weight percent isopropyl alcohol was determined.

Table I

| Additive | Concentration in Weight Percent Equivalent to 1.5 Wt. Percent Isopropyl Alcohol | Concentration in Weight Percent Equivalent to 2.0 Wt. Percent Isopropyl Alcohol |
|---|---|---|
| Perfluorooctanoic Acid | | 0.025 |
| Perfluorohexanoic Acid | | 0.025 |
| Perfluorobutanoic Acid | 0.10 | |
| Tetrahydro Furfuryl Alcohol | 0.16 | 0.23 |

The data show that the additives according to this invention are substantially more effective to prevent cold stalling than are the prior art additives, isopropyl alcohol and tetrahydrofurfuryl alcohol. The data also show that perfluorohexanoic and perfluorooctanoic acids are more effective than perfluorobutanoic acid.

While certain compositions, structures, process steps, and examples have been described for purposes of illustration, the invention clearly is not limited thereto. The essence of the invention is a fuel comprising at least one gasoline hydrocarbon and a minor proportion of a perfluorocarboxylic compound; and a method comprising supplying a perfluorocarboxylic compound to the carburetor of an internal combustion engine together with a hydrocarbon fuel.

I claim:

1. A fuel composition comprising a major proportion of a gasoline and from 0.001 to 0.1 weight percent of a saturated aliphatic perfluorocarboxylic acid having at least 3 carbon atoms per molecule.

2. A composition according to claim 1 wherein the proportion of said acid is from 0.02 to 0.06 weight percent.

3. A composition according to claim 1 wherein said perfluorocarboxylic acid contains at least 6 carbon atoms per molecule.

4. A gasoline containing from 0.001 to 0.1 weight percent of a saturated aliphatic perfluorocarboxylic acid having from 3 to 20 carbon atoms per molecule.

5. A composition according to claim 4 wherein said acid is perfluorooctanoic acid.

6. A composition according to claim 4 wherein said acid is perfluorohexanoic acid.

7. A composition according to claim 4 wherein said acid is perfluorobutanoic acid.

8. A composition according to claim 4 wherein said acid is perfluorodecanoic acid.

9. A composition according to claim 4 wherein said acid is perfluorododecanoic acid.

10. A liquid fuel composition comprising a major proportion of a hydrocarbon fuel which boils at a temperature not greater than 420° F. and which is suitable for use in operation of an internal combustion engine having a carburetor, and a minor proportion, up to 10 weight percent and sufficient to reduce cold stalling of said engine, of a compound represented by the formula $C_nF_{2n+1}COOH$ wherein $n$ is an integer of at least 3.

11. A normally liquid hydrocarbon fuel having a 50 percent distillation point below 310° F. and containing from 0.01 to 0.1 weight percent of perfluorooctanoic acid.

12. A normally liquid hydrocarbon fuel having a 50 percent distillation point below 310° F. and containing from 0.01 to 0.1 weight percent of perfluorohexanoic acid.

13. A normally liquid hydrocarbon fuel having a 50 percent distillation point below 310° F. and containing from 0.01 to 0.1 weight percent of perfluorobutanoic acid.

14. A method of operating an internal combustion engine which method comprises introducing into the carburetor of said engine, together with a fuel the vaporization of which in said carburetor is accompanied by cold stalling under cold-stalling conditions, a saturated aliphatic perfluorocarboxylic acid having at least 3 carbon atoms per molecule, in an amount sufficient to reduce cold stalling of said engine.

15. A method of operating an internal combustion engine which method comprises supplying to the carburetor of such engine, together with a gasoline, from 0.02 to 0.06 weight percent, based on said gasoline, of a saturated aliphatic perfluorocarboxylic acid having at least 6 carbon atoms per molecule.

16. In the operation of an internal combustion engine under cold idling conditions at an atmospheric temperature in the range 30 to 60° F. and a relative humidity greater than 60 percent, during which stalling of said engine ordinarily occurs as a result of ice accumulation in the carburetor, the method, of preventing such stalling, which comprises supplying to said carburetor, together with a gasoline, from 0.02 to 0.06 weight percent of perfluorooctanoic acid, based on the weight of said gasoline.

17. In the operation of an internal combustion engine under cold idling conditions at an atmospheric temperature in the range 30 to 60° F. and a relative humidity greater than 60 percent, under which conditions stalling of said engine ordinarily occurs as a result of ice accumulation in the carburetor, the method, of preventing such stalling, which comprises supplying to said carburetor, simultaneously with a suitable hydrocarbon fuel, a minor proportion, up to 10 weight percent based on said fuel and sufficient to reduce cold stalling of said engine, of a compound having the formula $C_nF_{2n+1}COOH$ wherein $n$ is an integer in the range 3 to 20.

18. A method according to claim 17 wherein said proportion is in the range 0.001 to 0.1 weight percent.

19. A method according to claim 17 wherein said compound is perfluorohexanoic acid and said proportion is in the range 0.001 to 0.1 weight percent.

20. A method according to claim 17 wherein said compound is perfluorobutanoic acid and said proportion is in the range 0.001 to 0.1 weight percent.

21. A method according to claim 17 wherein said compound is perfluorooctanoic acid and said proportion is in the range 0.001 to 0.1 weight percent.

22. A method according to claim 17 wherein said compound is perfluorodecanoic acid and said proportion is in the range 0.001 to 0.1 weight percent.

23. A method according to claim 17 wherein said compound is perfluorododecanoic acid and said proportion is in the range 0.001 to 0.1 weight percent.

References Cited in the file of this patent

UNITED STATES PATENTS

| | | |
|---|---|---|
| 2,599,338 | Lifson et al. | June 3, 1952 |
| 2,600,113 | Jones et al. | June 10, 1952 |